(12) United States Patent
Lawrence

(10) Patent No.: US 7,605,749 B2
(45) Date of Patent: Oct. 20, 2009

(54) MULTIFREQUENCY LINE BIASES FOR MULTIFREQUENCY GNSS RECEIVERS

(75) Inventor: David Gary Lawrence, Santa Clara, CA (US)

(73) Assignee: Novariant, Inc., Fremont, CA (US)

( * ) Notice: Subject to any disclaimer, the term of this patent is extended or adjusted under 35 U.S.C. 154(b) by 249 days.

(21) Appl. No.: 11/332,380

(22) Filed: Jan. 12, 2006

(65) Prior Publication Data

US 2007/0159385 A1 Jul. 12, 2007

(51) Int. Cl.
*G01S 1/00* (2006.01)
(52) U.S. Cl. .................................. 342/357.02
(58) Field of Classification Search ...............................
342/357.01–357.17
See application file for complete search history.

(56) References Cited

U.S. PATENT DOCUMENTS

| | | | | |
|---|---|---|---|---|
| 5,263,189 | A * | 11/1993 | Kultgen et al. ........... | 455/276.1 |
| 6,518,921 | B1 * | 2/2003 | Irvin et al. ................. | 342/387 |
| 2004/0176102 | A1 * | 9/2004 | Lawrence et al. ........ | 455/456.1 |
| 2004/0210389 | A1 | 10/2004 | Zimmerman et al. | |

OTHER PUBLICATIONS

U.S. Appl. No. 10/916,198, filed Aug. 11, 2004, Lawrence et al.
Mader, Gerald L., "GPS Antenna Calibration at the National Geodetic Survey," National Geodetic Survey, NOS, NOAA, Silver Spring, MD, Jul. 1999, 12 pages.

* cited by examiner

*Primary Examiner*—Thomas H Tarcza
*Assistant Examiner*—Nga X Nguyen
(74) *Attorney, Agent, or Firm*—Houston Eliseeva, LLP

(57) ABSTRACT

A differential carrier phase global navigation satellite system (GNSS) receiver with multiple antennas uses multiple GNSS carriers to determine position, which can improve the speed of integer searches, for example. In the system, an estimate of delays associated with the transmission paths between the antennas and receiver for at least one of the GNSS frequencies is stored. Typically, these are measures of the phase delay in the transmission paths for two or more of the GNSS frequencies such as in fractional cycles of the GNSS frequencies. Having this information solves problems associated with using multiple carrier frequencies. While cable delays typically have a fixed time delay, the signal paths for the different frequencies are not completely common—even if they were perfectly matched in time, the number of fractional cycles would still be different. Thus, the number of cycles a radio frequency (RF) signal is delayed is different for different frequencies.

34 Claims, 5 Drawing Sheets

Fig. 3A

Line bias store 158

| Path: | Carrier L1 | Carrier L2 | Carrier L5 | Carrier n |
|---|---|---|---|---|
| tp1 | ---- | ---- | ---- | ---- |
| tp2 | (tp2 fract. cycle diff. for L1 relative to tp1) | (tp2 fract. cycle diff. for L2 relative to tp1) | (tp2 fract. cycle diff. for L5 relative to tp1) | (tp2 fract. cycle diff. for carrier n relative to tp1) |
| ... | | | | |
| tpn | (tpn fract. cycle diff. for L1 relative to tp1) | (tpn fract. cycle diff. for L2 relative to tp1) | (tpn fract. cycle diff. for L5 relative to tp1) | (tpn fract. cycle diff. for carrier n relative to tp1) |

Fig. 3B

Line bias store 158

| Path: | Carrier L1 | Carrier L2 | Carrier L5 | Carrier n |
|---|---|---|---|---|
| tp1 | (absolute delay for L1 on tp1) | (absolute delay for L2 on tp1) | (absolute delay for L5 on tp1) | (absolute delay for carrier n on tp1) |
| tp2 | (absolute delay for L1 on tp2) | (absolute delay for L2 on tp2) | (absolute delay for L5 on tp2) | (absolute delay for carrier n on tp2) |
| ... | | | | |
| tpn | (absolute delay for L1 on tpn) | (absolute delay for L2 on tpn) | (absolute delay for L5 on tpn) | (absolute delay for carrier n on tpn) |

MULTIFREQUENCY LINE BIASES FOR MULTIFREQUENCY GNSS RECEIVERS

BACKGROUND OF THE INVENTION

The NAVSTAR Global Positioning System (GPS) is a global navigation satellite system (GNSS) developed by the U.S. military in the 1970's. The GPS space segment has -a nominal constellation of 24 satellites, four satellites in each of 6 orbit planes.

Originally conceived as a navigation aid for ships, the use of the system has become ubiquitous both within the military and within civilian and commercial applications. For example, many cars are outfitted with GPS navigation systems that locate the car on a displayed digital map. In commercial applications, GPS systems are used for surveying in addition to controlling vehicles such as graders during the laying of road beds or tractors on farms.

The Standard Positioning Service (SPS) signal was the original signal provided to civilian users of GPS. It is made up of an L-band carrier at 1575.42 megahertz (MHz) (referred to as the L1 carrier) modulated by a pseudorandom noise (PRN) C/A (course acquisition) code. The satellites are distinguished from each other by their unique C/A codes, which are nearly orthogonal to each other. The C/A code has a chip rate of 1.023 MHz and is repeated every millisecond. A 50 bit per second data stream is modulated with the C/A code to provide satellite ephemeris and health information. The phase of the C/A code provides a measurement of the range to the satellite. This range includes an offset due to the receiver clock and is therefore referred to as the pseudo-range.

Newer signals have been provided for civilian applications. One of these new signals is an unencrypted code located at 1227.60 MHz (referred to as the L2 carrier), and will be available for general use. The other signal, located at 1176.45 MHz (referred to as the L5 carrier), will be available on the GPS satellites scheduled for launch beginning in 2005. This new L5 signal falls in a band reserved for aeronautical radio navigation.

Other GNSS exist in addition to GPS, such as the Russian GLONASS and European GALILEO systems. Position detection systems can use one or more of these systems to generate position information.

To perform a three dimensional position fix, a GNSS position detection system traditionally requires a minimum of four satellites: one satellite phase measurement for each of the spatial dimension unknowns; and since the receiver clock error is common to all satellites, it represents an additional unknown for which a solution is required. The positioning accuracy provided by the SPS is on the order of ten meters.

Differential GPS (DGPS), or more generally, differential GNSS, is a variant method for providing higher positional accuracy. If a reference GPS receiver is placed at a known location on the ground, the bulk of the errors associated with the satellite phase measurements can be estimated. Phase corrections can be calculated and broadcast to a roving GPS user. Since most errors are highly correlated in a local area, the roving user's position solution after applying the corrections will be greatly improved.

Traditional DGPS systems use the C/A code phase measurements to arrive at position solutions. These systems provide 95% positioning accuracies on the order of a few meters. The precision of the L1 carrier phase measurement has been used to improve the performance of DGPS. Using carrier smoothed code techniques, DGPS performance improves to the meter level.

Further improvements are achieved through the use of kinematic DGPS or differential carrier phase position detection. This method refers to the use of the differentially corrected carrier phase measurements, possibly in addition to the code phase. Due to the short wavelength of the L1 carrier phase (about 19 centimeters), these measurements are extremely precise, on the order of several millimeters. Although the measurements can be corrupted slightly by error sources, the potential accuracy of kinematic positioning is on the centimeter level.

The carrier phase measurements, however, have an integer cycle ambiguity associated with them. This ambiguity arises from the fact that each cycle of the carrier phase is indistinguishable from the others. Thus, before centimeter level positioning can be achieved, the integer ambiguity must be resolved.

Some differential carrier phase position detection systems use a common clock to process carrier signal information from multiple antennas. This allows for position solutions with carrier signals from less than four satellites if the relative fractional phase delay associated with the carrier signal information from the various antennas is known or can be derived.

SUMMARY OF THE INVENTION

In general, according to one aspect, the invention features a system that comprises one or more global satellite navigation system (GNSS) receivers having a plurality of antenna inputs. A plurality of multi-frequency antennas are respectively connected to the plurality of antenna inputs through transmission paths. A common clock reference is used to process phase information from different ones of the antennas for a plurality of GNSS frequencies in response to an estimate of delays associated with the transmission paths for at least one of the GNSS frequencies.

In a preferred embodiment, one or more global satellite navigation system (GNSS) receivers having a plurality of antenna inputs are used.

In some embodiments, the estimate of delays includes a measure of a phase delay in the transmission paths for two or more of the GNSS frequencies, the phase delay being used in a determination of position information for the antennas. The estimate is a measure of a fractional phase delay difference in the transmission paths for two or more of the GNSS frequencies. However, the estimate of delays can also be provided as an absolute delay of the transmission paths.

In one implementation, the two or more of the GNSS frequencies include at least two of the L1, L2, and L5 carrier frequencies in the GPS system. In another implementation, all three of the L1, L2, and L5 carrier frequencies are used.

In one application, the system is used on one or more moving objects, such as tractors, earth moving machines, and/or implements attached thereto.

In one embodiment, at least one of the receivers comprises an oscillator for producing a clock signal and radio frequency sections, each one of the radio frequency sections receiving information from a different one of the multiple GNSS frequencies from one of the antennas.

The receivers resolve integer cycle ambiguities in carrier signals for a pair of the antennas at the GNSS frequencies by comparing a residual function derived from carrier phase measurements and fractional cycle delays for a plurality of possible integer combinations. The residual function can be derived from one or more pre-calibrated geometric constraints governing positioning of the antennas relative to each other.

In general according to another aspect, the invention features a system comprising one or more GNSS receivers and a plurality of antenna inputs to the one or more GNSS receivers. A plurality of multifrequency antennas is connected to the plurality of antenna inputs through transmission paths. Residuals derived from carrier phase measurements by the receivers from a plurality of frequencies are compared in a process of resolving cycle ambiguities associated with the carrier phase measurements.

In general according to another aspect, the invention features a position detection system comprising antennas for receiving L1, L2, and L5 carrier signals and a receiver for determining position information for the antennas in response to the received L1, L2, and L5 carrier signals from each of the antennas.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 3A and 3B are schematic diagrams showing the contents of the line bias store of the present invention;

DETAILED DESCRIPTION OF THE PREFERRED EMBODIMENTS

A differential carrier phase GNSS receiver with multiple antennas and a single clock must know the difference in the number of fractional cycles of delay between the cables that connect the antennas to the receiver in order to best perform integer searches and subsequently resolve the relative positioning between the antennas connected to those cables.

It should be noted, however, that having multiple frequencies can improve the speed of the integer searches, but there are challenges with using multiple frequencies. While cable delays typically have a fixed time delay, the number of cycles of delay is generally different for different frequencies. Also, the signal paths for the different frequencies are generally not completely common. Thus, the number of cycles a radio frequency (RF) signal is delayed is different for different frequencies. Therefore, the traditional approach for using a single estimate of the fractional number of cycles of delay in a cable (or between two cables) does not work well for more than a single frequency.

System Configurations

Figure 1:
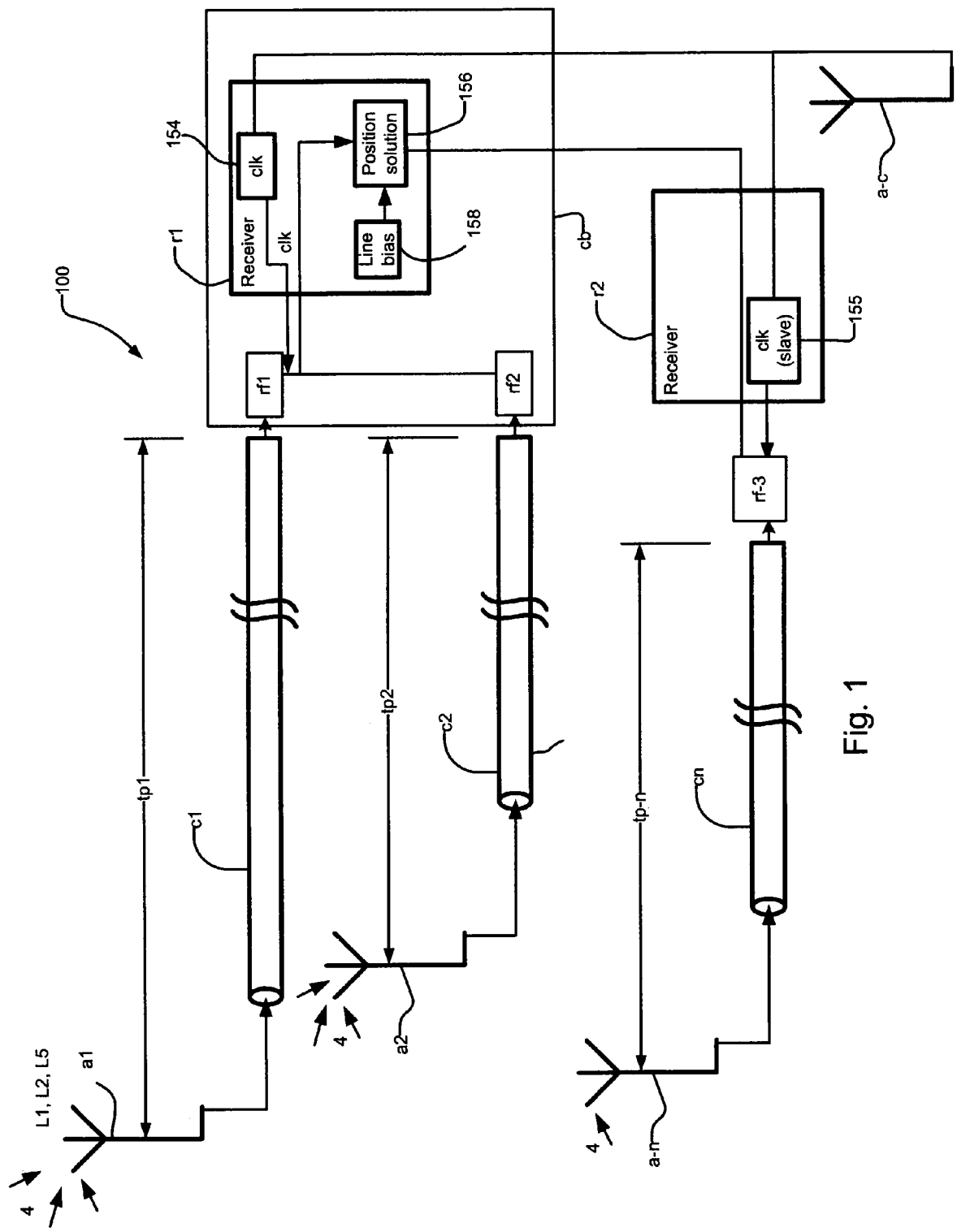
FIG. 1 is a schematic diagram showing a differential carrier phase GNSS system including the multifrequency line bias compensation according to the present invention.

FIG. 1 shows a differential carrier phase position detection system providing for multi carrier frequency line bias compensation, according to the principles of the present invention.

In more detail, the position detection system 100 generally comprises a series of antennas a1 to a-n. The antennas a1 to a-n receive carrier signals 4, typically from a satellite positioning or navigation system such as one or more GNSS satellites and/or from one or more ground-based transmission sources such as pseudolites. Such carrier signals can also come from many radio frequency (RF) sources, including those not intended for navigation. Such sources would include, but not be limited to, low earth orbiting (LEO) satellites or high definition television (HDTV) broadcast stations.

The antennas a1 to a-n provide signals to one or more receivers r1, r2. In one configuration, multiple antennas such as antennas a1 and a2, connect to a common receiver r1. This receiver uses its position solution unit 156 to determine the position of antennas a1 and a2.

Alternatively, multiple receivers are used in other implementations, each connecting to one or more other antennas. Specifically, in the illustrated embodiment, a third antenna a-n connects to a second receiver r2.

Typically, in this multi-receiver arrangement, the receivers r1, r2 are in a master-slave relationship to each other. Specifically, in the illustrated embodiment, receiver r2 passes carrier phase measurement information to receiver r1, which then generates a position solution 156 for each of antennas a1, a2 and a-n.

Preferably separate radio frequency stages rf1, rf2, rf-n are provided to process the multiple carrier frequencies from the respective antennas a1, a2, a-n. In another implementation, a multiplexer is used to selectively connect the receivers r1, r2 to the separate antennas a1, a2, a-n.

In one implementation, the rf stages are implemented as described U.S. Pat. Appl. Pub. No.: US 2004/0176102 A1, Pub. Date: Sep. 9, 2004, by Lawrence, et al. in order to lower system cost, this application being incorporated herein in its entirety by this reference.

A common clock 154, usually from one of the receivers r1, is used as a reference to process carrier signal information from the antennas a1, a2, a-n to improve the performance of differential carrier phase position detection.

In the illustrated example, receiver r1 contains the master clock or the common clock reference 154. This is provided to receiver r2. In one example, receiver r2 operates from the clock signal generated by the master clock 154. In another example, illustrated, receiver r2 has its own clock unit 155. It generates a clock signal in response to the master clock signal generated by master clock 154. Thus, the clock unit 155 of receiver r2 is a slave clock unit relative to the clock signal from the master clock 154 of receiver r1. In this way, a common clock reference is generated for multiple receivers r1, r2.

In still another example, a common antenna, such as antenna a-c is provided. This antenna receives a GNSS or other signal that is used to simulate the common clock reference by each of clocks 154 and 155 in the separate receivers r1, r2. In more detail, comparing the phase for a satellite measured on the common antenna a-c using two independent clocks 154, 155, the systems can observe the relative drifts between the two clocks and can thereby simulate the effect of a common clock by removing the drift from phase measurements that use one of the clocks.

Each of the antennas a1, a2, a-n may be connected to the receivers r1, r2 via respective antenna modules. In one particular embodiment, these modules have separate amplifiers and signal conditioning circuits for transmitting multiple carrier signals, such as carrier signals L1, L2 L5, to the receivers r1, r2. In other examples, the modules include down converters or other mixers for modifying the carrier signals for transmission to receivers r1, r2.

A number of other implementations also exist for the common clock. Generally, the common clock means that the receiver r1 is not required to solve for a time unknown when solving for relative position of the antennas a1, a2, a-n. There are a number of ways to achieve this common clock processing. For example, carrier signals from all antennas can be processed using the same local oscillator signal generated by an oscillator in the clock module 154, or phase locked to, a common oscillator. Another example relies on the derivation of the phase of a common signal using independent clocks for processing that common signal.

In one embodiment, the receiver r1 comprises an oscillator in the clock module 154. This oscillator produces the clock signal. The radio frequency sections rf1 to rf2 are integrated on a common circuit board cb with the receiver r1.

Figure 2:
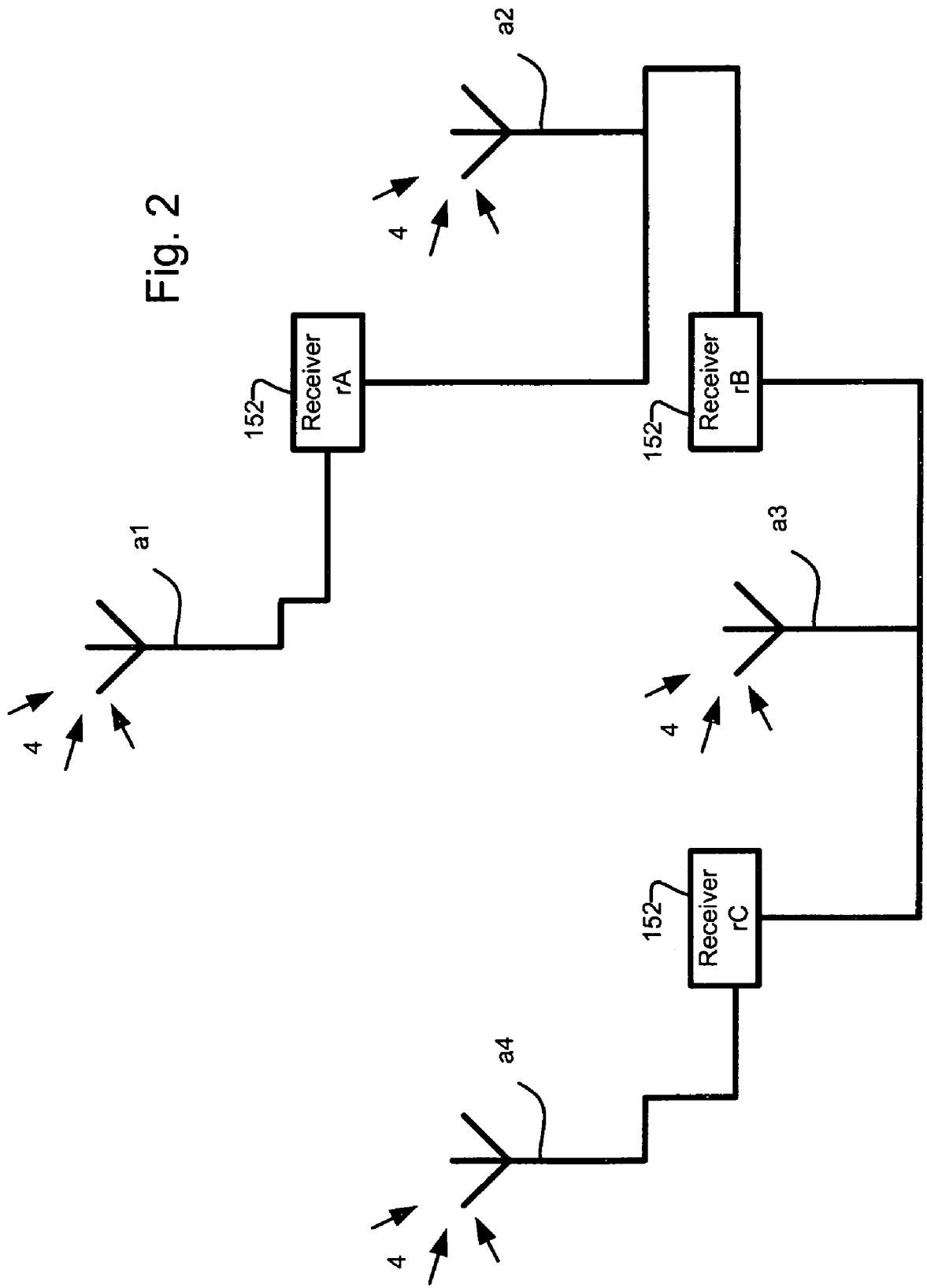
FIG. 2 is a schematic diagram of a differential carrier phase GNSS system having daisy-chained receivers for generating a common clock reference.

Specifically, with reference to FIG. 2, one can daisy chain multiple dual antenna receivers rA-rC between successive antennas a1-a4 such that most of the receivers process information from common antennas. In the illustrated example, receiver rA receives carrier signal information from antennas a1 and a2, receiver rB receives carrier signal information from antennas a2 and a3, and receiver rC receives carrier signal information from antennas a3 and a4. Thus, the receivers obtain the phase for a satellite carrier signal 4 received on a shared antenna. They can thus compensate for the difference in clock error between them. In another example, a common signal is injected into all of the signals from the antennas and a measurement of the phase of that common signal made using each independent receiver clock. In still another embodiment, the loop of FIG. 2 is closed such that receiver rA receives the signal from antenna a4 to provide a closed loop system with each receiver sharing an antenna with another one of the receivers.

Returning to FIG. 1, cables c1 to cn enable signal transmission between the antennas a1 to a-n and the receiver r1, r2. Each of these cables c1, c2, cn has a characteristic length or delay. These lengths in combination with delays through analog components in each of the antennas and filters and amplifiers, if used, result in antenna specific delays in the transmission of the carrier signal information to the receivers r1 and r2, and possibly clock and other information to the antennas. These transmission path delays are designated tp1, tp2, tp-n. Moreover, because of how the multiple carriers signals L1, L2, L5 are processed in these transmission paths tp1, tp2, tp-n, the delay for different frequencies over the transmission paths tp1, tp2, tp-n is further usually unique. This is because different frequencies are usually sent through independent filters in the antennas and in the RF sections, and delays through these different paths are not necessarily matched. And even if the time delays are matched, the number of cycles of delay will generally be different for different frequencies.

Without knowing the delay associated with these transmission paths tp1, tp2, tp-n, for the various carrier frequencies, carrier signals of an additional common satellite or pseudolite is required for a position module 156 of the receiver 152 to generate a position solution. Also, knowing the delay improves cycle ambiguity resolution performance as set forth in more detail below, and subsequent positioning performance. For example: in general with only three common satellites, positions solutions cannot be calculated without having a common clock and a known line bias. However, even when more then three common satellites are available, line bias knowledge is helpful because it can facilitate better geometry and faster integer searches with greater certainty.

According to one aspect of one embodiment, the receiver r1 is provided with a line bias store 158 that stores the delays associated with each transmission path tp1, tp2, tp-n and for each frequency processed, L1, L2, L5, for example, and received by the antennas a1, a2, a-n.

The line-carrier frequency bias information from the line bias store 158 is used by the position solution module 156 to determine the relative position or possibly platform attitude when antennas a1, a2, a-n at fixed to a common platform. That is, the line bias store 158 contains bias information on per frequency, per cable basis.

FIGS. 3A and 3B illustrate two different implementations of the line bias store 158.

In FIG. 3A, the line bias store contains an estimate of the delays associated with the transmission paths tp1-tp-n and for each of the separate carrier frequencies L1, L2, L5, and other carrier n.

In this example, a measure of the phase delay in the transmission paths is used for two or more of the frequencies. Specifically, a fractional phase delay difference in the transmission paths is stored in each of the storage locations in the line bias store 158. Specifically, in the illustrated embodiment, transmission path tp1 is used to provide the nominal delay of the system and no values need to be stored for this transmission path. For each of the other transmission paths, tp2 to tp-n, a fractional cycle difference for each of the carriers is stored. Specifically, for transmissions tp2 and carrier L1, a fractional phase difference for carrier L1 relative to transmission path tp1 is stored. Similarly, for transmission path tp2 and carrier L2, a fractional difference is stored. Thus, the fractional cycle difference for each of the transmission paths, relative to one of the transmission paths, or some other transmission path is stored. In this way, the relative delays of the transmission paths can be determined by the position solution module in performing the carrier phase differential GPS analysis.

FIG. 3B illustrates an alternative embodiment. The line bias store 158 contains the absolute delay for each carrier, carrier L1, L2, L5, and carrier n for each of the transmission paths tp1, tp2 . . . tp-n. Thus, the absolute delay for carrier L1 on transmission path tp1 is stored but also for carrier L2 and transmission path tp1. In a similar way, for carrier L2, the absolute delay on transmission paths tp1, tp2, tp-n is further stored.

While the present discussion has been relative to carriers L1, L2, and L5, which are typically associated with the GPS system, in further embodiments, the carrier frequencies produced by the Galileo system are used. Further, combinations of carrier signals from the Galileo and the GPS and possibly even the GLONASS system are used in still other embodiments.

The following pseudo code (using a MatLab syntax) illustrates one method for processing carrier phase information for multiple frequencies from multiple antennas using line bias information for the separate frequencies and separate antennas according to the present invention. (Note: this code is included to illustrate aspects of an implementation of the invention and would be helpful to one skilled in the art in deploying a GNSS receiver or other system. Nonetheless, it may require customization for an application and/or minor debugging by such person).

lb1=0.1; % L1 single difference line bias in fractional L1 cycles
lb2=0.3; % L2 single difference line bias in fractional L2 cycles
lb5=0.5; % L5 single difference line bias in fractional L5 cycles
x=[2;0;0];
Hx=H7(:,1:3); % H7 is an example GPS observation matrix
nl1=4;
nl2=4;
nl5=0;
N1=round(randn(nl1,1)*5);
N2=round(randn(nl2,1)*5);
N5=round(randn(nl5,1)*5);
lb=[ones(nl1,1)*lb1;ones(nl2,1)*lb2;ones(nl5,1)*lb5];
lbe=lb+randn((nl1+nl2+nl5),1)*0.005; % line bias estimate (assumes line biases known very well)
N=[N1;N2;N5];
Hxm=[Hx(1:nl1,:)/LAM1;Hx(1:nl2,:)/LAM2;Hx(1:nl5,:)/LAM5];
c=Hxm*x+lb+N+randn((nl1+nl2+nl5),1)*0.03;
p=Hxm*x+randn((nl1+nl2+nl5),1)*4; % simulate random code phase noise+multipath
cc=c−lbe;
Ne=cc−p;
cs=cc(1:3)−round(Ne(1:3));
Hs=Hxm(1:3,:);
nresmin=100000;
nresnextmin=100001;
Nm=0;
xn=norm(x);
for n1=−16:16
for n2=−16:16
for n3=−16:16
xs=Hs\(cs(1:3)−([n1;n2;n3]));
xsn=norm(xs);
if (abs(xsn−xn)<0.03)
Ns=round(cc−Hxm*xs);
res=(null(Hxm')'*(cc−Ns));
nr=norm(res);
if (nr<nresmin)
nresnextmin=nresmin;
nresmin=nr;
Nm=Ns;
elseif (nr<nresnextmin)
nresnextmin=nr;
end
end
end
end
Nm−N
nresmin
nresnextmin Specifically, in lines 01-03, simulated line biases for three antennas in fractional cycles of carriers L1, L2, and L5, respectively, are loaded into variables lb1, lb2, lb3.

In line 04, a position for the antenna is established in a Cartesian coordinate system.

The observation matrix Hx is created is line 05. Each row holds a vector that is a unit line of site vector pointing to one of the satellites.

Lines 09-11 are used to generate random integers for each satellite. These are the numbers that the process solves for.

Line 12 creates a vector of simulated line biases. This is repeated for each satellite.

Line 13 creates simulated fractional cycle line bias estimates. The random number generation is used to reflect the fact that the line biases are not known perfectly.

Line 15 creates a new matrix in which the magnitude of each row is divided by the wavelengths, converting meters to cycles in the carriers.

Line 16 simulates a single difference carrier phase measurement.

Line 17 simulates a single differenced code phase measurement. Here, any difference between carrier and code phase delay is ignored, but could be calibrated if significant. Specifically, calibration of code phase biases could be done once carrier cycle ambiguities are known by solving for x using carrier phase and then averaging p−Hxm*x over a long period of time either dynamically or statically.

This simulates the use of the information from the code phase measurement. Generally, the code phase measurements can bound the range of integers or cycle differences leaving an uncertainty of 5-20 cycles. In line 18, the carrier phase is corrected with the line bias estimate.

Note: if line bias estimates are not known for a frequency, the measurements and geometry matrix for that frequency can be "double differenced" by subtracting the single difference measurement and the row of the geometry matrix (Hx) for one satellite from all of the other satellites for that frequency, thereby canceling out the unknown line bias.

In line 19, an estimate of the integers is made based on the difference between the code phase and carrier phase measurements. It is produced by subtracting code phases from carrier phases. The process solves for offsets from this estimate.

Line 20 adds an offset by subtracting off the integer estimate of the integers found in line 19 from the carrier phase so that integers are relative to that estimate.

Line 21 assigns a new matrix Hs to the first three rows of Hxm.

Lines 22-25 initialize variables including variables nresmin and nresnextmin that will contain the minimum and second smallest residuals respectively.

Line 26 begins a Hatch-type search. For every combination of the first three integers in the search space, it solves for a position using those three satellites. Then, given that position, it solves for the remaining satellite integers. Given all of the integers it calculates a residual. The set of integers with the minimum residual is the most likely candidate for the true set of integers.

Line 29 solves for the assumed positions given the candidate set of integers.

Line 31 relates to an optional length predetermined constraint that will increase likelihood of unique low residual. This is removed if baseline length is not fixed or known.

Line 33 finds the residual.

Line 34 finds the magnitude of residual.

The integer set is saved if the residual for this integer set is the lowest found so far in line 38.

EXAMPLE APPLICATIONS

Figure 4:
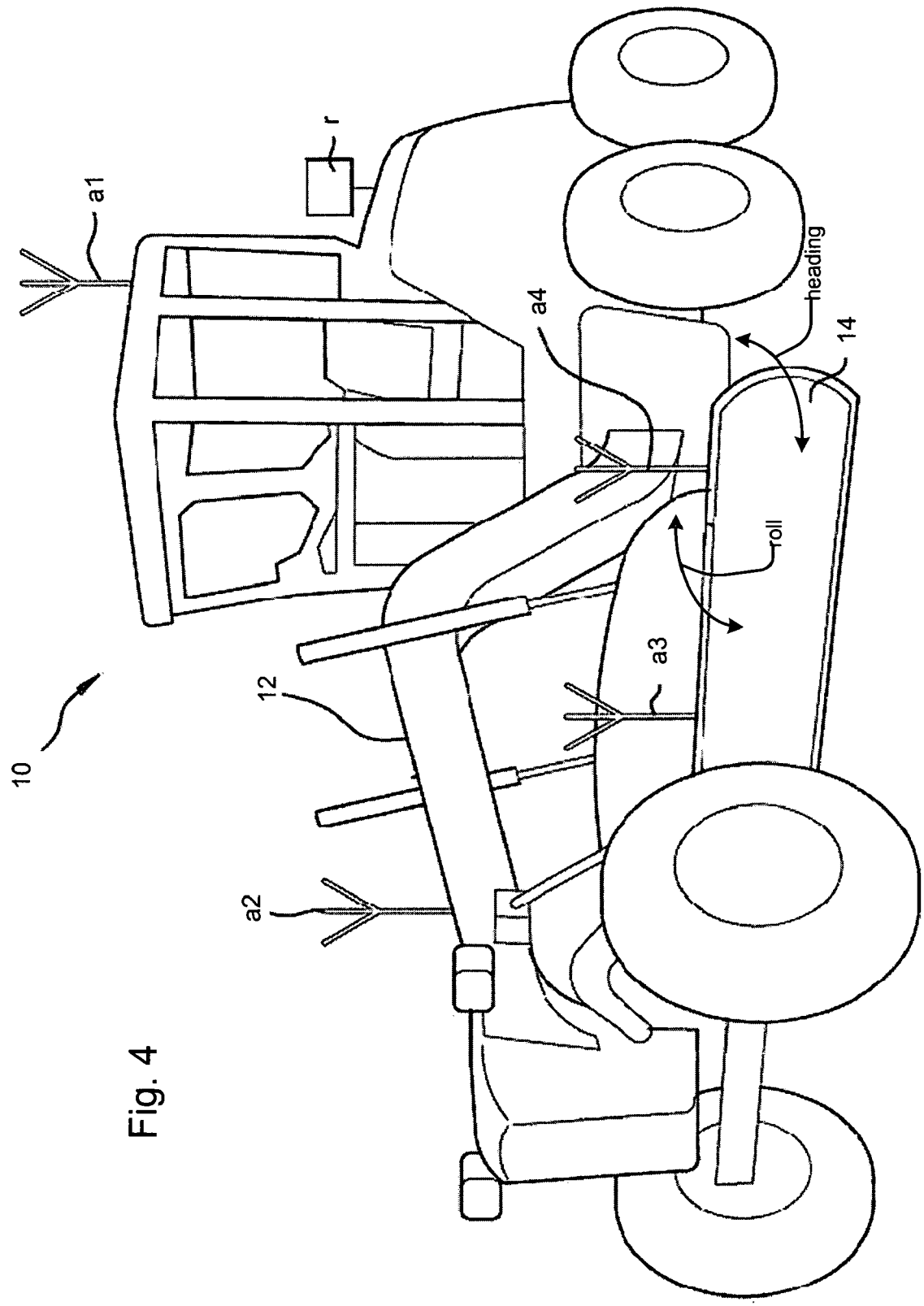
FIG. 4 is a schematic diagram showing embodiment of the present invention on a motor grader.

FIG. 4 illustrates an application of one embodiment of the inventive position detection system 100. In this example, a series of antennas a1 to a4 are fixed to a vehicle, such as road grader 10. In other embodiments, the antennas 110 are attached to: 1) a tractor and towed/pushed implement, or 2) two parts of an articulated vehicle, such as a tractor trailer.

The road grader comprises a frame 12, to which a cab is attached. In this example, two antennas are fixed relative to the frame 12. Specifically, a first antenna a2 is attached to the frame near the front of the grader 10 and a second antenna a1 is fixed to the frame 12 at the cab.

Providing the two antennas a1, a2 on the frame 12 enables the receiver r to determine the position of the road grader 10 and also its heading.

The blade antennas a3, a4 that are located on the blade 14 and are used to determine the position, and possibly heading (i.e., angle of the blade in the plane of the ground), and roll (angle of the blade in a plane perpendicular to the plane of the ground) of the blade 14.

In one embodiment, techniques for compensating for or determining changes in relative antenna attitude are used as described in U.S. patent application Ser. No. 10/916,198, filed: Aug. 11, 2004, entitled Method and System for Circular Polarization Correction for Independently Moving GNSS Antennas, by Lawrence, et al., this application being incorporated herein in its entirety by this reference.

Figure 5:
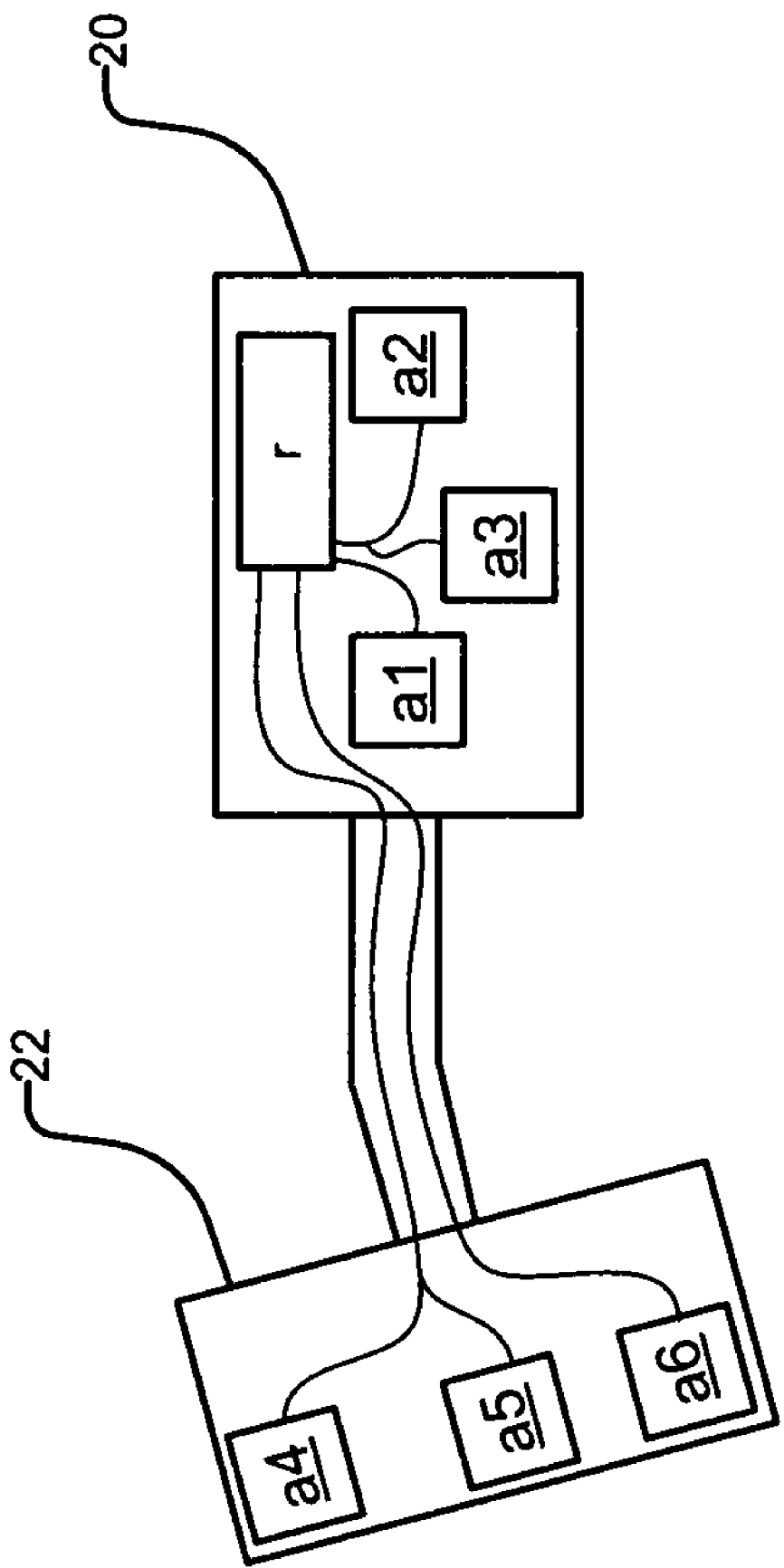
FIG. 5 is a schematic diagram showing an embodiment of the present invention for an articulated vehicle.

FIG. 5 shows an embodiment of the present invention used in an articulated vehicle system.

In more detail, in the illustrated implementation, a vehicle 20 is pulling or towing a trailer 22, or other implement that is free to pivot in the lateral direction. Examples include a truck with a trailer or a farm tractor with a towed implement, such as a planter.

A single GPS receiver r is used with one or more antennas a1, a2, a3 on the vehicle 20 and one or more antennas a4, a5, a6 on the implement or trailer 22. In this configuration the three antennas on each of the vehicle and implement define a plane and thus heading or baseline enables a position solution module in the receiver r to determine the heading angle θ of the implement 22 relative to the vehicle 20, without the need for a potentiometer, encoder, or other direct angular sensor, and without the need for a heading sensor on the trailer or implement 22. The measurement takes advantage of the carrier phase processing as described above to determine the angle θ, even with fewer than 4 satellites tracked on the implement antenna(s) a3, a4.

In this example, pre-calibrated geometric constraints may be used such as a range of angles between baselines of the antennas and a range of distances between the antennas.

The relationship between the vehicle and its implement or between the vehicle and its blade enable the provision of precalibrated geometric constraints. In simplest case, there is one platform with two or three antennas. These precalibrated geometric constraints govern the relative positioning of the antennas and limit the integer search space when finding the residual function for the possible integer combinations. In the example of the tractor in the implement, the precalibrated geometric constraints may include the heading angle between the baselines of the antennas. They also include a possible range of distances between the antennas.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system, comprising:
    one or more global satellite navigation system (GNSS) receivers having a plurality of antenna inputs;
    a plurality of multi-frequency antennas respectively connected to the plurality of antenna inputs through transmission paths; and
    a common clock reference for processing phase information from different ones of the antennas for a plurality of GNSS frequencies in response to an estimate of delays associated with the transmission paths for at least one of the GNSS frequencies, wherein the estimate of delays includes a measure of a phase delay in the transmission paths for two or more of the GNSS frequencies, the phase delay being used in a determination of position information for the antennas by the one or more receivers;
    wherein at least one of the receivers resolves integer cycle ambiguities for a pair of the antennas in carrier signals at the GNSS frequencies by comparing a residual function derived from carrier phase measurements and the measure of the phase delay in the transmission paths for the two or more of the GNSS frequencies for a plurality of possible integer combinations.

2. A system as claimed in claim 1, comprising two or more of the global satellite navigation system (GNSS) receivers.

3. A system as claimed in claim 1, wherein the estimate of delays includes a measure of a fractional phase delay difference in the transmission paths for two or more of the GNSS frequencies, the fractional phase delay being used in a determination of position information for the antennas.

4. A system as claimed in claim 1, wherein the estimate of delays is in fractional cycles of the GNSS frequencies.

5. A system as claimed in claim 1, wherein the estimate of delays is an absolute delay of the transmission paths.

6. A system as claimed in claim 1, wherein the estimate of delays is an absolute delay for individual ones of the transmission paths.

7. A system as claimed in claim 1, wherein GNSS carrier signals at the GNSS frequencies are produced by the Global Positioning System.

8. A system as claimed in claim 1, wherein GNSS carrier signals at the GNSS frequencies are produced by the Galileo System.

9. A system as claimed in claim 1, wherein the GNSS frequencies include at least two of the L1, L2, and L5 carrier frequencies.

10. A system as claimed in claim 1, wherein the GNSS frequencies include L1, L2, and L5 carrier frequencies.

11. A system as claimed in claim 1, wherein the antennas are mounted on one or more moving objects.

12. A system as claimed in claim 1, wherein the antennas are mounted on different platforms that move with respect to each other.

13. A system as claimed in claim 12, wherein at least one of the receivers determines an attitude of a moving object on which the antennas are mounted by processing the phase information from the antennas using the estimate of the delays.

14. A system as claimed in claim 1, wherein the common clock reference is formed by synchronizing multiple clock signals of at least one receiver.

15. A system as claimed in claim 1, wherein a clock of one of the receivers responds to a clock of another one of the receivers to form the common clock reference.

16. A system as claimed in claim 1, wherein the receivers respond to a clock injected into both receivers.

17. A system as claimed in claim 1, wherein the common clock reference is formed by synchronizing the receivers to a common antenna.

18. A system as claimed in claim 1, wherein at least one of the receivers comprises:
    an oscillator for producing a clock signal; and
    radio frequency sections, each one of the radio frequency sections responding to the clock signal for receiving information from a different one of the multiple GNSS frequencies from one of the antennas.

19. A system as claimed in claim 1, wherein the residual function is additionally derived from one or more pre-calibrated geometric constraints governing positioning of the antennas relative to each other.

20. A system as claimed in claim 1, wherein the at least one of the receivers uses at least one pre-calibrated geometric constraint governing positioning of the antennas relative to each other to limit searches among the possible integer combinations.

21. A system as claimed in claim 1, wherein the at least one of the receivers uses pre-calibrated geometric constraints governing positioning of the antennas relative to each other when determining position information for the antennas using the common clock reference.

22. A system as claimed in claim 21, wherein the pre-calibrated geometric constraints include an angle between baselines of the antennas.

23. A system as claimed in claim 21, wherein the pre-calibrated geometric constraints include a range of distances between the antennas.

24. A system as claimed in claim 1, wherein the antennas are mounted on a vehicle, with a first one of the antennas rigidly mounted relative to a frame of the vehicle and a second one of the antennas mounted on a part of the vehicle that moves relative to the frame.

25. A system as claimed in claim 24, wherein the part is a blade of the vehicle.

26. A system as claimed in claim 1, wherein one of the antennas is mounted on a vehicle, and a second one of the antennas is mounted on an implement towed by the vehicle.

27. A system, comprising:
one or more global satellite navigation system (GNSS) receivers having a plurality of antenna inputs;
a plurality of multi-frequency antennas respectively connected to the plurality of antenna inputs through transmission paths; and
at least one receiver including a common clock reference, the receiver processing phase information from different ones of the antennas for a plurality of GNSS frequencies in response to estimates of different delays associated with the transmission paths for each of the GNSS frequencies, wherein the estimates of the different delays includes a measure of a phase delay in the transmission paths for the two or more of the GNSS frequencies, the phase delay being used in a determination of position information for the antennas, and wherein the receiver resolves integer cycle ambiguities for a pair of the antennas in carrier signals at the GNSS frequencies by comparing a residual function derived from carrier phase measurements and the measure of the phase delay in the transmission paths for each of the GNSS frequencies for a plurality of possible integer combinations.

28. A system as claimed in claim 27, wherein the at least one receiver comprises:
an oscillator for producing a clock signal that functions as the common clock reference; and
radio frequency sections, each one of the radio frequency sections responding to the clock signal for receiving information from a different one of the multiple GNSS frequencies from one of the antennas.

29. A system as claimed in claim 27, wherein the residual function is additionally derived from one or more pre-calibrated geometric constraints governing positioning of the antennas relative to each other.

30. A system as claimed in claim 27, comprising two or more of the global satellite navigation system (GNSS) receivers.

31. A system as claimed in claim 27, wherein the estimate of delays includes a measure of a fractional phase delay difference in the transmission paths for two or more of the GNSS frequencies, the fractional phase delay being used in a determination of position information for the antennas.

32. A system as claimed in claim 27, wherein the estimate of delays is in fractional cycles of the GNSS frequencies.

33. A system as claimed in claim 27, wherein the estimate of delays includes an absolute delay of the transmission paths.

34. A system as claimed in claim 27, wherein the estimate of delays includes an absolute delay for individual ones of the transmission paths.

* * * * *